US011585445B1

(12) United States Patent
Daniels et al.

(10) Patent No.: US 11,585,445 B1
(45) Date of Patent: Feb. 21, 2023

(54) VALVE ASSEMBLY WITH A REPLACEABLE VALVE INSERT

(71) Applicant: SPM OIL & GAS INC., Fort Worth, TX (US)

(72) Inventors: Jarryd Daniels, Houston, TX (US); Russell Andrus, Mustang, OK (US)

(73) Assignee: SPM Oil & Gas Inc., Fort Worth, TX (US)

( * ) Notice: Subject to any disclaimer, the term of this patent is extended or adjusted under 35 U.S.C. 154(b) by 0 days.

(21) Appl. No.: 17/510,199

(22) Filed: Oct. 25, 2021

(51) Int. Cl.
*F16K 3/02* (2006.01)
*F16K 27/04* (2006.01)

(52) U.S. Cl.
CPC .......... *F16K 3/0227* (2013.01); *F16K 27/044* (2013.01)

(58) Field of Classification Search
CPC .... F16K 3/0227; F16K 3/0272; F16K 3/0281; F16K 3/16; F16K 3/20; F16K 27/044
See application file for complete search history.

(56) References Cited

U.S. PATENT DOCUMENTS

| 3,273,855 A * | 9/1966 | Wells ................. F16K 3/0227 251/327 |
| 3,765,647 A * | 10/1973 | Grove ................. F16K 3/0227 251/328 |
| 4,376,526 A | 3/1983 | Freeman |
| 10,316,976 B2 | 6/2019 | Linder |
| 2009/0095934 A1 * | 4/2009 | Cain ................. F16K 3/0227 251/329 |
| 2016/0040788 A1 * | 2/2016 | Taguchi ............. F16K 3/0227 251/301 |
| 2019/0346048 A1 * | 11/2019 | Harrel ............... F16K 5/0407 |
| 2022/0221064 A1 * | 7/2022 | Boyd ................. E21B 34/02 |

FOREIGN PATENT DOCUMENTS

WO WO-2018/096428 A1 5/2018
WO WO-2020/214578 A1 10/2020

* cited by examiner

*Primary Examiner* — Kelsey E Cary

(57) ABSTRACT

A valve insert for a valve assembly, the valve insert positionable within a valve inlet end and/or a valve outlet end and including a fluid passageway to permit fluid flow through the valve assembly. The valve insert is formed having an outer surface for supporting the valve insert within the bore and an inner surface defining a fluid passageway, the inner and outer surfaces extending longitudinally between a proximal face configured to engage a valve seat, and an opposed outer face. The valve insert further includes a recessed portion formed on the outer surface, the recessed portion being configured to receive a seal to sealingly engage the bore.

20 Claims, 2 Drawing Sheets

VALVE ASSEMBLY WITH A REPLACEABLE VALVE INSERT

TECHNICAL FIELD

This disclosure relates to valve assemblies, and in particular, to valve assemblies having a removable insert disposed within a valve body.

BACKGROUND

During fracking and other oilfield operations, valves such as gate valves, for example, are subject to harsh conditions during operation. These include but are not limited to high flow rates, corrosive chemicals, and fine sand, each contributing to significant wear on the various valve seals and seat pockets typically associated with such valves. Once the valve is brought in for service after use, it needs to be disassembled and thoroughly inspected. Oftentimes parts need to be replaced or reworked, which can be expensive and time consuming. For example, contaminants may erode the valve body sealing surfaces requiring weld repair, heat treatment, and machining.

With respect to gate and other types of valves, access to the internal valve seats and/or inserts requires extensive disassembly and emptying lubricants before these and other components can be replaced. After replacement of a valve seal and/or valve insert, assembly of the gate member and greasing the valve must be performed. Regardless of which components are damaged and/or need to be replaced, these activities can be time consuming and tedious, increasing the length of time that the valve assembly is out of service.

SUMMARY

According to a first aspect, there is provided a valve assembly having a valve body having a bore extending between a valve inlet and a valve outlet and a valve member movable between an open position, to enable fluid to flow through the valve body, and a closed position, to prevent fluid flow through the valve body. The valve assembly also includes a valve seat disposed within the bore on each side of the valve member and a removable valve insert secured within the bore and extending at least partially between at least one of the valve inlet and the valve outlet and the valve seat. The removable insert includes an inner surface forming a fluid passageway to enable fluid flow through the valve assembly and an outer surface for supporting the valve insert within the bore and a recessed portion formed on a portion of the outer surface, the recessed portion configured to receive a seal to seal on the valve bore.

According to one embodiment, the valve assembly further includes a retainer ring secured to at least one of the inlet and the outlet to secure the valve insert within the valve body between the valve seat and the retainer ring.

According to another embodiment, the valve assembly includes a groove that is formed on the recessed portion that is sized to receive a seal therein.

According to still another embodiment, the valve assembly includes a plurality of grooves formed on the recessed portion to receive a corresponding seal therein.

In yet another embodiment, the valve insert includes a proximal face facing a seat seal face of the valve seat for sealingly engaging the valve seat, and an opposed outer face, wherein the recessed portion extends from the proximal face at least partially toward the opposed outer face.

In still another embodiment, the recessed portion extends a total distance of at least 1/10 of the total length of the outer surface of the valve insert.

In yet another embodiment, the valve insert includes the proximal face facing the seat seal face of the valve seat for sealingly engaging the valve seat and an opposed outer face, wherein the opposed outer face is flush with the valve inlet end or the valve outlet end.

In another embodiment, the valve insert further includes a flange extending therefrom, the flange includes at least one recessed area configured to receive a trash seal for sealingly engaging the valve body.

In still another embodiment, the flange is securely fastened to the valve body to secure the valve insert to the valve body.

According to a second aspect, there is provided a method of installing a valve insert into a valve body. The method includes forming a recessed portion on an outer surface of the valve insert and installing a seal on the recessed portion. The method further includes aligning the valve insert with a bore formed in the valve body and positioning the valve insert within the bore such that the seal sealingly engages the bore. The method also includes securing the valve insert to the valve body.

According to some embodiments, the step of securing the valve insert to the valve body includes securing a retainer ring to securely fasten the valve insert within the valve body.

According to another embodiment, the method further includes forming a groove within the recessed portion to receive the seal.

In still other embodiments, the method includes forming a plurality of grooves within the recessed portion configured to receive a corresponding seal.

According to other embodiments, the method includes removing the valve insert from the bore and installing a new seal in the recessed portion.

According to yet other embodiments, the method includes reinserting the valve insert within the bore such that the new seal sealingly engages the bore.

According to a third aspect, there is provided a valve insert for a valve assembly, the valve insert positionable within a valve inlet or a valve outlet and includes a fluid passageway to permit fluid flow through the valve assembly. The valve insert is formed having an outer surface for supporting the valve insert within the bore and an inner surface forming a fluid passageway, the inner and outer surfaces extending between a seat surface for engaging a valve seat, and an opposed outer surface. The valve insert further includes a recessed portion formed on the outer surface, the recessed portion being configured to receive a seal to sealingly engage the bore.

According to some embodiments, a groove formed on the recessed portion and is sized to receive a seal therein.

According to other embodiments, the insert includes a plurality of grooves formed on the recessed portion to receive a corresponding seal therein.

According to yet other embodiments, the recessed portion extends a total distance of greater than half of the total length of the outer surface of the valve insert.

In still other embodiments, the valve insert includes a proximal face facing a seat seal face of the valve seat for sealingly engaging an adjacently positioned valve seat.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

Figure 1:
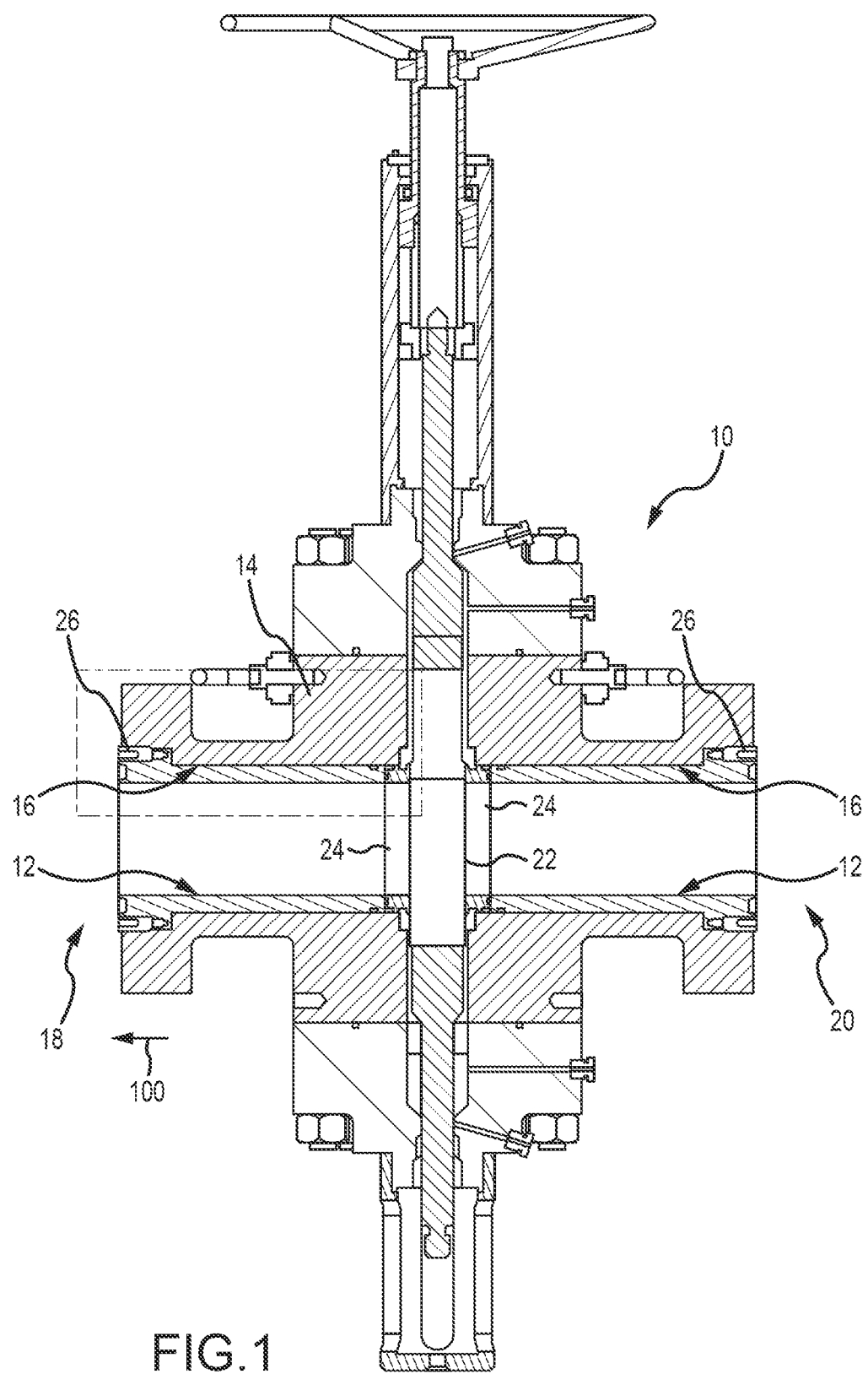
FIG. 1 illustrates a section view of a valve assembly, in which a removable insert is shown.

FIG. 1 is an illustration of a valve assembly 10 in which two removable valve inserts 12 are disposed. As explained in greater detail below, the valve inserts 12 are removable such that worn or otherwise damaged valve inserts 12, seals, and other valve components can be quickly removed and replaced through a valve inlet side 18 (which may also be referred to as "inlet end" of valve body 14) and/or valve outlet side 20 (which may also be referred to as "outlet end" of valve body 14) in order to efficiently return the valve assembly 10 to operation without or otherwise minimizing the need for weld repairing, heat treating, machining, and/or skim cutting operations to the valve assembly 10.

Referring to FIG. 1, the valve assembly 10 is formed having a valve body 14 in which a bore 16 extends between the valve inlet side 18 and the valve outlet side 20. As explained in greater detail below, the bore 16 is sized to receive the valve inserts 12 on either or both the inlet side 18 and/or the outlet side 20. The valve assembly 10 further includes a valve member (e.g., valve gate 22), a pair of valve seats 24 disposed within the bore 16 on each side of the valve gate 22, and two retainer rings 26, one on the inlet end 18 and one on the outlet end 20. The retainer rings 26 may secure each valve insert 12 inside the bore 16 to secure each valve seat 24 in position against the valve gate 22. In operation, the valve gate 22 is movable between an open position, to enable fluid to flow through a flow passageway 28 (shown in FIG. 2) defined radially within the valve inserts 12 and valve seats 24, and a closed position, to prevent fluid flow through the flow passageway 28. While FIG. 1 illustrates the valve assembly 10 as a slab gate valve, it should be understood that the valve assembly 10 may be a wedge gate valve, a split gate valve, or any other type of gate valve.

Figure 2:
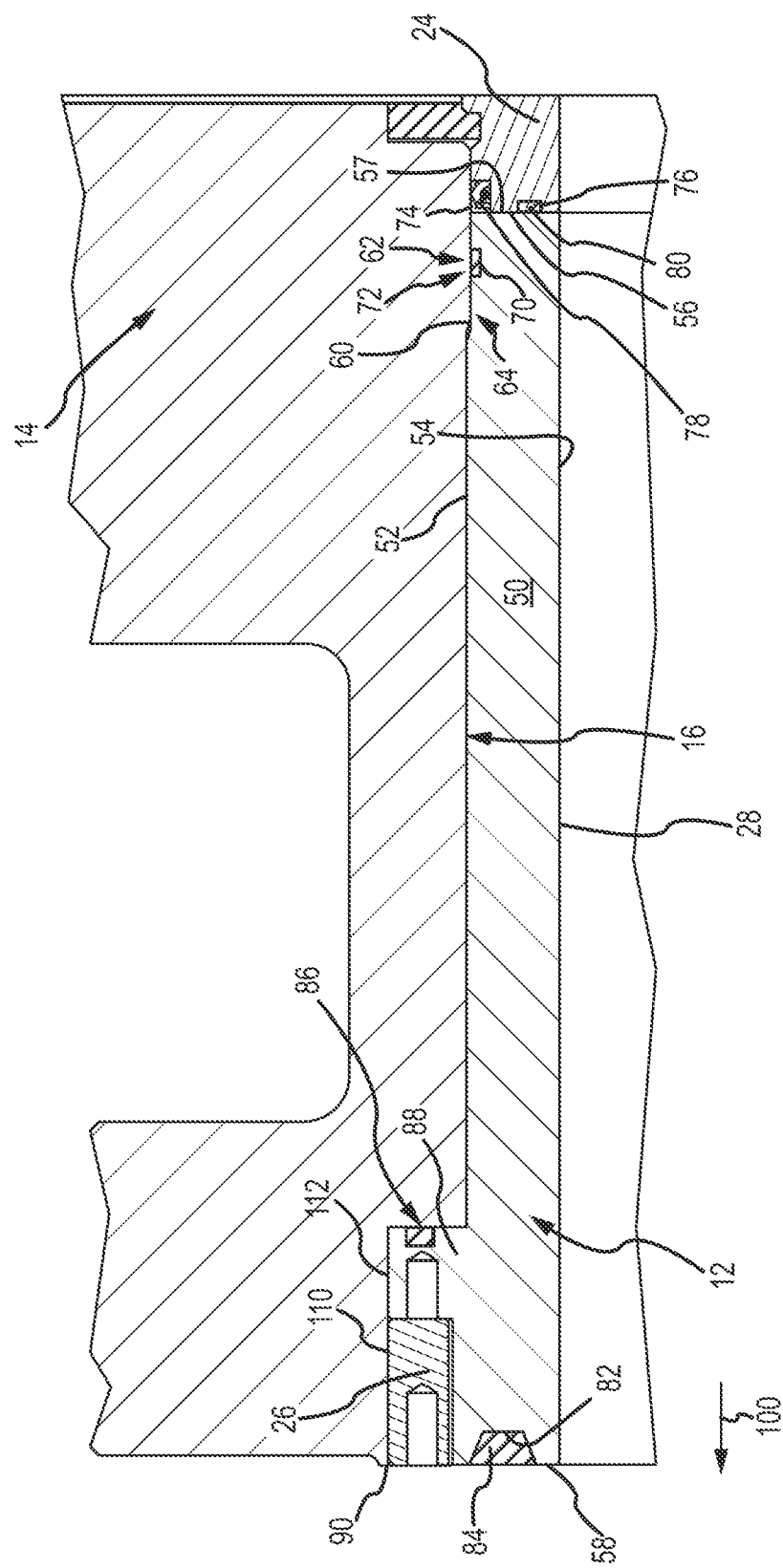
FIG. 2 is a detail view of a portion of the valve assembly of FIG. 1 illustrating the valve insert.

Referring now to FIG. 2, the bore 16 has a reduced bore section 64. The valve insert 12 illustrated in FIG. 2 include an annular, hollow shaped main body 50 having an outer surface 52 and an inner surface 54, the inner surface 54 at least partially defining the flow passageway 28. The valve insert 12 further includes a proximal face 57 facing a seat seal face 56 of the valve seat 24 for, as explained in greater detail below, sealingly engaging the valve seat 24, and a distal/outer face 58 for sealingly engaging an adjacent flange or other adjacent structure at the valve inlet end 18. The other valve insert 12 adjacent to the valve outlet side 20 may share identical features with the valve insert 12 illustrated in FIG. 2 (e.g., being a mirror image thereof).

Referring specifically to FIG. 2, when the valve insert 12 is securely fastened within the valve body 14, a plurality of seals work to prevent and/or otherwise substantially eliminate fluid leakage. For example, in the embodiment illustrated in FIG. 2, the outer surface 52 includes an insert seal 72 so as to, as discussed in greater detail below, sealingly engage the bore 16 of the valve body 14 along the reduced bore section 64. Further, the seat seal face 56 of the valve seat 24 includes grooves 74 and 76 sized and positioned to receive seat seals 78 and 80, respectively. It should be understood that a greater or fewer number of seals may be used depending on the desired configuration. While FIGS. 1 and 2 illustrate the grooves 74 and 76 disposed at the seat seal face 56 of the valve seat 24, in other embodiments, at least one of the grooves 74 and 76 receiving the seat seals 78 and 80 may be disposed at the proximal face 57 of the valve insert 12 facing the seat seal face 56 of the valve seat 24. In yet other embodiments, one or more of the grooves 74 and 76 may be disposed at the seat seal face 56 of the valve seat 24 while, at the same time, one or more of the other grooves 74 and 76 may be disposed at the proximal face 57 of the valve insert 12 facing the seat seal face 56 of the valve seat 24. In the illustrated example, the outer face 58 of the valve insert 12 includes a groove/recessed portion 82 that is sized to receive a gasket 84. In the illustrated example, a trash seal 86 is disposed axially between a flanged portion 88 of the valve insert 12 and the valve body 14. In other examples, the trash seal 86 is optional. It should be understood that a greater or fewer number of seals may be used depending on the desired configuration.

Referring to the valve insert 12 illustrated in FIG. 2, the outer surface 52 includes a step 60 defining a recessed portion 62 of the valve insert outer surface 52. In other examples, the outer surface 52 has a constant outer diameter. The recessed portion 62 may extend around the circumference of the outer surface 52. The step 60 is sized and otherwise formed such that the recessed portion 62 fits and is otherwise received in a correspondingly shaped reduced bore section 64 in the valve body 14 so as to, as explained in greater detail below, provide a sufficient clearance to allow insertion and removal of the valve insert 12 within the bore 16 without damaging the insert seal 72. In particular, the outer diameter of the recessed portion 62 is less than an inner diameter of the bore 16 so that there is sufficient clearance between the bore 16 and the recessed portion 62 of the valve insert 12 to enable insertion from either of the inlet and outlet ends 18 and 20, respectively.

As illustrated in FIG. 2, the recessed portion 62 extends from the proximal face 57 facing the seat seal face 56 of the valve seat 24 toward the opposed distal outer face 58. In the illustrated example, the length of the recessed portion 62 is at least ⅒ of the longitudinal length of the valve insert 12 (e.g., at least ⅒ of the distance between the proximal face 57 facing the seat seal face 56 of the valve seat 24 and the opposed outer face 58). It should be understood that the recessed portion 62 may extend otherwise. The length of the recessed portion 62, the reduced bore section 64, and the outer surface 52 may be shorter or longer to accommodate various sealing locations along the valve insert 12. For example, the recessed portion 62 may extend any distance up to ⅞ of the longitudinal length of the valve insert 12. In some examples, the recessed portion 62 may extend any distance along the longitudinal length of the valve insert 12 until the recessed portion 62 intersects the flanged portion 88 of the valve insert 12. Regardless of the length of the recessed portion 62 and the position of the step 60, the reduced diameter of the valve insert 12 along the length of the recessed portion 62 enables easier insertion of the valve insert 12 inside the bore 16.

With continued reference to FIG. 2, the recessed portion 62 includes a groove 70 sized to receive the insert seal 72. In operation, the insert seal 72 prevents and/or otherwise resists fluid from leaking from the valve assembly 10. In particular, the insert seal 72 is positioned within the groove 70 and is sized to sealingly engage the reduced bore section 64 of the bore 16 so as to prevent the fluid leakage. It should be understood that while the embodiment illustrated in FIG.

2 illustrates a single groove 70 and corresponding insert seal 72, a greater number of grooves 70 may be formed in the recessed portion 62 to accommodate the at least one insert seal 72 to enable, as explained in greater detail below, a longer working life of the valve insert 12.

As a result of extended periods of operation of the valve assembly 10, periodic maintenance is required to replace components such as, for example, the valve seats 24 and the seals 72, 78, and 80. With specific reference to the inlet side 18 (the same procedure is applicable for the outlet side 20), maintenance is performed by removing the valve insert 12 from the bore 16 in the direction of arrow 100 until the proximal face 57 facing the seat seal face 56 of the valve seat 24 is completely removed from the valve body 14. Once removed, the valve insert 12 can be replaced with a new replacement valve insert 12 if the condition warrants. Otherwise, the valve insert 12 can be repaired, if damaged, and a used insert seal 72 can be removed from the valve insert 12 and replaced with a new insert seal 72. Additionally and/or optionally, depending on the condition of the groove 70 and surrounding outer surface of the recessed portion 62 (e.g., depending on the condition of the surface due to erosion and/or wear and tear), a new groove (not illustrated) can be used or otherwise formed on the recessed portion 62 adjacent the original groove 70 between the position of original groove 70 and the outer face 58 so as to receive and otherwise support a new replacement insert seal 72. Once the insert seal 72 is disposed within the groove 70, the valve insert 12 is repositioned inside and otherwise mounted within the valve body 14 such that the new insert seal 72 sealingly engages the bore 16 along the reduced bore section 64 at a new sealing location against the valve body 14 at a position further spaced apart from the valve seat 24. It should be understood that in addition to replacing insert seal 72, seat seals 78 and 80 along with valve seat 24 (and any other components of the valve assembly 10) may be repaired and/or replaced prior to reinsertion of the valve insert 12. According to embodiments disclosed herein, the inner diameter of the bore 16 through the valve inlet side 18 and the valve outlet side 20 is large enough such that when the valve insert 12 is removed from the bore 16, the valve seats 24 can be removed from the valve body 14 for repair or replacement through either the valve inlet or valve outlet sides 18 and 20.

According to some embodiments, the outer surface 52, and in particular, the recessed portion 62 can be pre-formed with multiple grooves 70 or such additional grooves 70 can be formed thereon after the valve insert 12 is removed from the valve body 14 during repair. By utilizing a plurality of grooves 70 and the at least one insert seal 72 along the recessed portion 62, the useful life of the valve insert 12 can be extended. For example, each time the valve assembly 10 is taken from service for maintenance, the valve insert 12 may be removed and a new groove 70 may be formed on the recessed portion 62 at a position toward the outer face 58. Alternatively, the insert seal 72 may be replaced and otherwise positioned into a new/unused groove 70 (if previously formed within the recessed portion 62). In some examples, more than one insert seal 72 may be positioned in the plurality of grooves 70 along the recessed portion 62. The number of the insert seals 72 may correspond to the number of the grooves 70. When the valve insert 12 is removed, the used insert seals 72 may be replaced with new insert seals 72. This process may reduce or eliminate the need to weld, heat treat, machine, and skim cut the valve insert 12 and/or the valve body 14 since the sealing location may be adjusted according to the new positions of the insert seals 72.

According to embodiments disclosed herein, a valve insert 12 may be disposed on either side of the valve gate 22 and extends axially from a corresponding valve seat 24 to the respective inlet and outlets sides 18 and 20. Thus, the valve insert 12, the valve seat 24, and the seals 72, 78, and/or 80 may be replaced without disassembling the valve gate 22 simply by removing the valve inserts 12 on each side of the valve gate 22 to gain full access through the inlet and outlet sides 18 and 20. This advantageous method provides a more effective turn-around time for the valve assembly 10 to be put back into the operation since there is no need to disassemble and pull out the valve member 22 in order to access the valve insert 12, the valve seat 24, and the seals 72, 78, and/or 80.

As shown in FIG. 2, the valve body 14 includes a flange portion 90 for connection to an adjacent structure (e.g., another valve assembly), which may be referred to as "flanged connection". The flange portion 90 of the valve body 14 may include several thru holes that in combination with suitable fasteners, e.g., studs and nuts, may be used to connect the valve body 14 to the adjacent surface of another structure. In some other examples, a studded connection may be used in place of the flanged connection. The studded connection may include blind tapped holes instead of thru holes. The flanged connection provides a relatively longer valve body 14, and enables a relatively longer valve insert 12, in comparison to the studded connection. The longer valve insert 12 has a longer outer surface 52 for defining the recessed portion 62 thereon, in comparison to a relatively shorter valve insert used with the studded connection. Thus, more grooves 70 can be formed on the recessed portion 62 and the insert seals 72 may be replaced more times (in comparison to a shorter valve insert having a shorter recessed portion with less axial distance for grooves). Therefore, a longer lifetime of the valve insert 12 may be achieved when the flanged connection is used to connect valve body 14 to adjacent structures.

With continued reference to FIG. 2, the retainer ring 26 is provided to securely fasten the valve insert 12 inside the valve body 14. In other examples, the retainer ring 26 is optional. In the example illustrated in FIGS. 1 and 2, the retainer ring 26 includes a threaded exterior surface 110 for threadingly engaging the valve body 14 at the valve inlet and outlet sides 18 and 20, respectively. Alternatively, the exterior surface 110 of the retainer ring 26 may be non-threaded. When secured to the valve body 14, the retainer ring 26 secures the valve insert 12 within the bore 16 to prevent unintended movement and/or removal of the valve insert 12 from the valve inlet and outlet sides 18 and 20. Two or more tapped holes are disposed within the retainer ring 26 to facilitate installation and removal of the retainer ring 26 to/from the valve body 14. Alternatively, the tapped holes are optional. Regardless of the method of securing the retainer ring 26, when installed, the retainer ring 26 securely fastens the valve insert 12 inside the bore 16. Alternatively, exterior surface 112 on the flanged portion 88 may be threaded to secure to corresponding threads on the valve body 14. Two or more tapped holes are disposed within the flanged portion 88 to facilitate installation and removal of the valve insert 12 to/from the valve body 14. Alternatively, the tapped holes are optional. In some examples, the insert 12 may be secured within the bore 16 by an adjacent surface of another structure against outer face 58.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have been described in connection with what are presently considered to be the most practical and preferred embodiments and it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A valve assembly comprising:
   a valve body having:
     a bore;
     an inlet end; and
     an outlet end;
   a valve member movable between an open position, to enable fluid flow through the valve body, and a closed position, to prevent the fluid flow through the valve body;
   a valve seat disposed within the bore and configured to contact the valve member in the closed position; and
   a valve insert disposed within the bore and extending in a longitudinal direction at least partially between the inlet end and the valve seat or the outlet end and the valve seat, the valve insert including:
     an inner surface defining a fluid passageway to enable the fluid flow through the valve body;
     an outer surface for supporting the valve insert within the bore, the outer surface having a step defining a recessed portion configured to receive a seal to sealingly engage the bore; and
     a proximal face configured to engage the valve seat, wherein the proximal face defines a flat surface extending from the inner surface to the recessed portion of the outer surface.

2. The valve assembly of claim 1, further comprising a retainer ring, the retainer ring secured to at least one of the inlet or outlet ends of the valve body to secure the valve insert within the valve body between the valve seat and the retainer ring.

3. The valve assembly of claim 1, further comprising a groove formed on the recessed portion sized to receive the seal therein.

4. The valve assembly of claim 1, further comprising a plurality of grooves formed on the recessed portion to receive corresponding seals therein.

5. The valve assembly of claim 1, wherein the proximal face is configured for sealingly engaging a seat seal face of the valve seat, and wherein the valve insert further includes an opposed outer face, wherein the recessed portion extends from the proximal face at least partially towards the opposed outer face.

6. The valve assembly of claim 1, wherein the recessed portion extends a total distance of at least 1/10 of a total length of the outer surface of the valve insert.

7. The valve assembly of claim 1, wherein the valve insert further includes an opposed outer face, wherein the opposed outer face is flush with the inlet end of the valve body.

8. The valve assembly of claim 1, wherein the valve insert further includes a flange extending therefrom, the flange including at least one recessed area configured to receive a trash seal for sealingly engaging the valve body.

9. The valve assembly of claim 8, wherein the flange is securely fastened to the valve body to secure the valve insert to the valve body.

10. A method of installing a valve insert into a valve body, the method comprising:
    forming a step defining a recessed portion on an outer surface of the valve insert;
    installing a seal on the recessed portion;
    positioning the valve insert within a bore formed in the valve body, the seal sealingly engaging the bore with the valve insert positioned therein,
      wherein a proximal face of the valve insert is configured to engage a valve seat associated with the valve body,
      wherein the proximal face defines a flat surface extending from an inner surface of the valve insert to the recessed portion of the outer surface, and
      wherein the inner surface defines a fluid passageway configured to enable fluid flow through the valve body; and
    securing the valve insert to the valve body.

11. The method of claim 10, wherein securing the valve insert to the valve body comprises securing a retainer ring to the valve body to securely fasten the valve insert to the valve body.

12. The method of claim 10, further comprising forming a groove within the recessed portion, the groove configured to receive the seal.

13. The method of claim 10, further comprising forming a plurality of grooves within the recessed portion, the plurality of grooves configured to receive corresponding seals.

14. The method of claim 10, further comprising removing the valve insert from the bore and installing a different seal on the recessed portion.

15. The method of claim 14, further comprising reinserting the valve insert within the bore such that the different seal sealingly engages the bore.

16. A valve insert for a valve assembly, the valve insert positionable within a valve inlet end or a valve outlet end of a valve body having a bore, the valve insert having a fluid passageway to permit fluid flow through the valve assembly, the valve insert comprising:
    an outer surface for supporting the valve insert within the bore and an inner surface defining the fluid passageway, the inner and outer surfaces extending longitudinally between a proximal face configured to engage a valve seat and an opposed outer face; and a step defining a recessed portion formed on the outer surface, the recessed portion configured to receive a seal to sealingly engage the bore, wherein the proximal face defines a flat surface extending from the inner surface to the recessed portion of the outer surface.

17. The valve insert of claim 16, further comprising a groove formed on the recessed portion sized to receive the seal therein.

18. The valve insert of claim 16, further comprising a plurality of grooves formed on the recessed portion to receive corresponding seals therein.

19. The valve insert of claim 16, wherein the recessed portion extends a total distance of greater than half of a total length of the outer surface of the valve insert.

20. The valve insert of claim 16, wherein the proximal face of the valve insert is perpendicular to the outer surface of the valve insert, the proximal face configured to sealingly engage a seat seal face of the valve seat.

* * * * *